Aug. 27, 1957　　　　L. W. ALVAREZ　　　　2,804,614
SUPPRESSED SIDE-LOBE RADIO RECEIVING SYSTEM
Filed Feb. 23, 1951　　　　　　　　　　3 Sheets-Sheet 1

INVENTOR.
Luis W. Alvarez
BY
Lippincott & Smith
ATTORNEYS

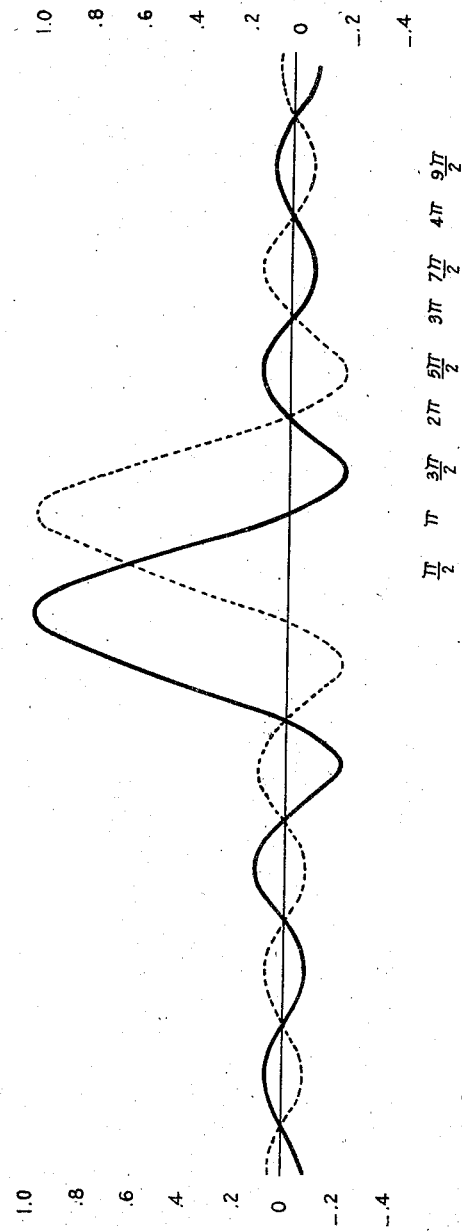

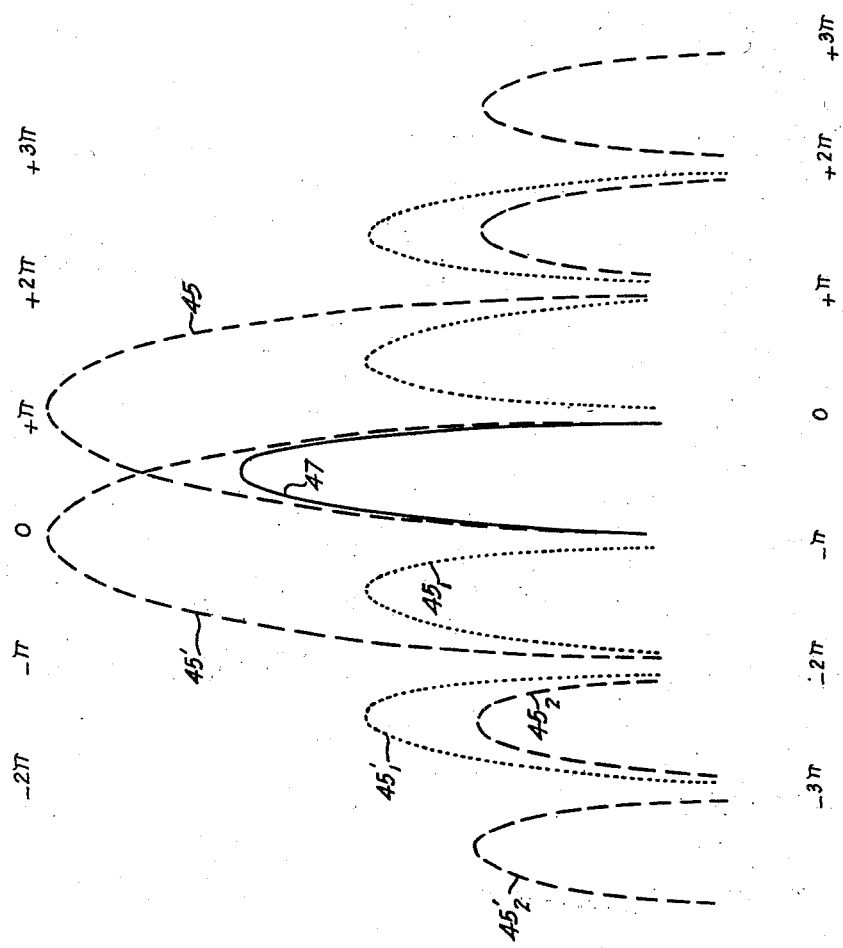

United States Patent Office 2,804,614
Patented Aug. 27, 1957

2,804,614

SUPPRESSED SIDE-LOBE RADIO RECEIVING SYSTEM

Luis W. Alvarez, Berkeley, Calif.

Application February 23, 1951, Serial No. 212,404

12 Claims. (Cl. 343—16)

This invention relates to directional radio systems and particularly to radio receiving systems of the type used in radar, radar beaconry and the like.

In systems of the character described it is desirable that the radio beam produced be as sharply directive as possible, the energy radiated or received being concentrated within an extremely narrow angle. It is well known that in systems of this type radio waves follow the laws of physical optics, and that the width and character of the beam produced by any antenna array can be derived from the same considerations as those used in deriving the diffraction patterns of optical beams. Because the wavelengths employed in such systems are relatively large in comparison with the dimensions of the antenna array itself, the optical analogy which is applicable is that of the illumination produced through a narrow slit or pinhole.

Under these conditions the radiation pattern produced is that of a central beam or lobe of high intensity, which is flanked on either side by narrower lobes of less intensity. The width of the main lobe may be defined either as half the angle included between the nulls or points of zero radiation on either side of the central axis of the beam or as the angle included between the points at which the power radiated has fallen to one-half of its maximum value. Where the optical slit is uniformly illuminated or the corresponding antenna array is uniformly excited the first definition is preferable. With non-uniform illumination of the slit or excitation of the antenna array there may be no actual null, in which case the second definition is used. With either definition the width between nulls of the principal lobe of the pattern can be quite closely approximated by the equation $$\Delta\theta = \frac{K\lambda}{a} \qquad \text{Equation 1}$$

where $\lambda$ is the wavelength, $a$ the width of the aperture or spread of the antenna array and K is a constant depending upon the form and illumination of the aperture, $\Delta\theta$ being the width of the beam itself in radians. The minimum value of K, giving the greatest sharpness of the principal lobe of the pattern, is one-half. This is the value where two narrow illuminated slits are spaced a distance apart, but it has the disadvantage that the side lobes which are developed are equal in intensity to the principal lobe. A single uniformly illuminated aperture gives the value of K equal to one. With non-uniformly illuminated apertures the value of K rises slightly and the nulls become less sharply defined.

The resolving power of the radar system, i. e. its ability to distinguish between two closely adjacent reflecting objects, is dependent upon the width of the principal lobe. It might therefore appear that the choice of an antenna array from radar use would be that giving the minimum width of beam. Equally important, however, is the ability to distinguish between radiation received on the principal lobe and that received on the side lobes of the pattern. For this reason the double array system giving the minimum value of K has not been used, since the side lobes receive as much energy as does the principal one. The uniformly excited array gives the next sharpest type of pattern for the principal lobe, but although the side lobes are greatly reduced in energy and it might appear that they would be readily distinguished they are still troublesome because the attenuation from a returned echo varies so rapidly with the distance and size of a reflecting object that a difference of 27 db (which is the difference between the principal and first side lobes with this type of radiator when used in a radar system, or half this value in beaconry) may not be definitive. False indications from the side lobe can therefore cause confusion. It is for this reason that many present radar systems use non-uniformly illuminated slits, giving values of K of about 1.25. This broadens the beam but greatly reduces the indensity of the side lobes.

It is obvious from the equation given above that the greater the ratio of the width of antenna spread or "aperture" to the wavelength used the greater will be the sharpness of the beam. In many cases, however, this ratio cannot be raised for physical reasons; there is no room for a larger antenna in the vehicle or installation, and the wavelength cannot be decreased because of atmospheric attenuation effects. In any case, the ratio of intensities of side lobes to main lobe remain constant; the whole pattern merely shrinks uniformly in angle.

Considering the uniformly excited type of antenna array, the amplitude of the field at any angle from the axis of the principal lobe may be expressed by the equation $$A = A_o \frac{\sin x}{x} \qquad \text{Equation 2}$$

The angle $x$, in turn, is defined by $$x = \frac{\pi a}{\lambda} \sin \Theta \qquad \text{Equation 3}$$

where $\Theta$ is the angle measured from the normal to the array. In the cases of most interest, $\Theta$ is so small that this equation can be written to good approximation as $$x = \frac{\pi a \Theta}{\lambda}$$

The principal object of this invention is to provide a directional radio system having a degree of resolution substantially that obtainable where K has the ideal value of one-half and wherein the side lobes of the patterns produced are either cancelled or so attenuated as to be without any practical effect whatsoever. Since, in accordance with this invention, the received power is somewhat attenuated, another object of the invention is to provide means for automatically reverting to a conventional-type system at long ranges, thus regaining the sensitivity of such systems although at the expense of decreased resolution at such extreme distances. Still another object of the invention is to provide a system wherein the same antenna array may be used for both transmission and reception, as is current practice, without interference with the other advantages which the system possesses. Other objects and advantages will be described or will become apparent in the course of this specification.

In the drawings:

Fig. 4 is a curve showing a variation of amplitude of radiated signals with variation of the angle $x$ as defined above; and Fig. 5 is a diagram, plotted in semi-logarithmic coordinates, showing a relationship between the principal and side lobes of a radio system in accordance with this invention and illustrating the method of eliminating the side lobes and sharpening the principal lobe.

Figure 1:
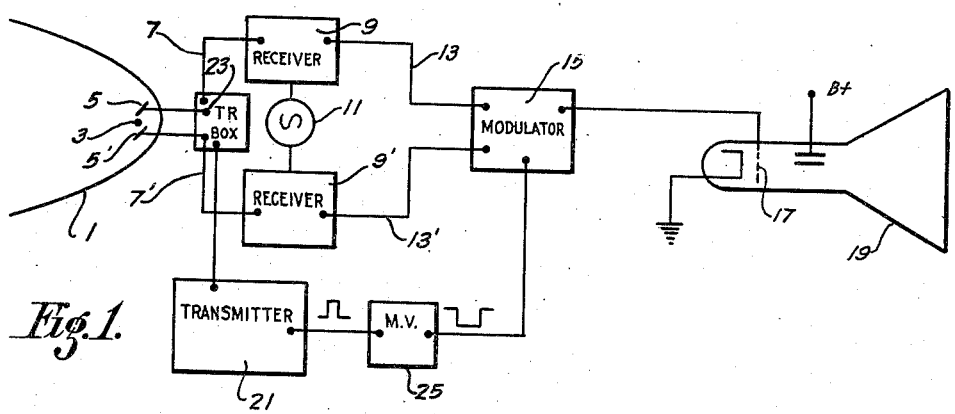
Fig. 1 is a block diagram illustrating a radar system in accordance with this invention.

It is characteristic of directional antenna systems of the uniformly excited variety that there is an abrupt reversal of relative phase between the principal lobe and the side lobe, i. e., the antenna being excited in phase and used as a radiator, the signals emitted in any adjacent pair of lobes will be 180° out of phase. This is the significance of the oscillations of the solid curve of Fig. 4 (which is plot of Equation 2 above) about the zero axis, a negative amplitude being equivalent to a reversal of phase. Conversely, if two in-phase signals are radiated from the same distance and with the same power, the distant transmitters, however, being located in positions corresponding to adjacent lobes, the received signals will be proportional in amplitude to the signals which would be transmitted by the same antenna system in the same directions and will again be 180° out of phase. It is obviously more convenient and understandable to describe the characteristics of a system in connection with its transmitting pattern. Since its receiving pattern is identical, it is legitimate to describe the characteristics in terms of transmission, even though it be the received signals which are of immediate interest, and therefore, throughout this specification and claims, the antenna systems used will be described in terms of transmission, even though it be its receiving function that is directly under consideration.

Still considering the uniformly excited type of antenna, the full width (null to null) of the principal lobe is almost exactly double that of the more prominent side lobes. It is possible, with substantially all antennas of this type, to shift direction of the lobes slightly, with respect to the physical axis of the antenna array, without materially changing the characteristics of the pattern produced. In the language of geometrical optics, we can say that the aberrations are small when we are only an angle $\Delta\theta$ away from the axis. In accordance with this invention, as considered broadly, an antenna array of the type described is so coupled to two receiving channels that the patterns produced are shifted relatively to each other such that the maximum of one coincides with the first null of the other, and vice versa. Such a shifted pattern is indicated by the dotted curve of Fig. 4. The methods of producing such shifts are well known, and are utilized in the "lobe-switching" type of radar operation. Where lobe-switching is used, however, the amount of shift produced may have any value within wide limits, whereas in accordance with this invention the shift produced should be substantially exact. Signals are received simultaneously on the two channels thus provided and preferably, but not necessarily, are heterodyned to a lower frequency. A common oscillator is used to provide the heterodyning frequency for the two channels, it being well known that relative phase relationships are preserved in such heterodyning. With a shift of this magnitude one-half of the two principal lobes overlap and therefore the signals received over the two channels from a common source within the overlapping angle will be in phase with each other. The other halves of the two principal lobes each coincide with the first side lobe of the other channel, and therefore signals received from a position lying within the side lobe of one channel and the principal lobe of the other will be 180° out of phase. The same will be true of all signals received except from the direction of the overlapping principal lobes. This relationship is shown in Fig. 4; only where the two principal lobes overlap do the solid and dotted curves have the same sign.

The signals received from the two channels are compared in phase in such manner that no indication is given when the two channels are out of phase and hence to indicate only signals from the overlapping portions of the principal lobes. Indicating means are provided for displaying the resultant signal. Preferably the phase comparing means takes the form of a simple modulator, which in effect, multiplies the two signals, giving a positive product where the signal are in phase and a negative product when out of phase, and the indicator is arranged to respond only to positive signals. One such form of modulator is a vacuum tube having two control grids, both of which are normally biased to cutoff. If the two signals to be compared are fed to these two grids the tube will pass current only when both are positive with respect to their normal bias and therefore only the signals from the overlapping portion of the central lobes will be received.

Means may be provided, as in the ordinary radar equipment, for utilizing the same antenna both to transmit and receive, preferably, in this case, feeding both of the channels in parallel and in phase in transmitting. A separate antenna may, of course, be provided for transmitting. Means may also be provided for disabling the modulator or other phase comparator at a predetermined interval after the transmission of a signal, so that reflections or responses from greater distances will be received in the ordinary manner and at a higher level than is given by the mutually modulated signals.

All of the above will be more readily understood by reference to the drawings. Considering first Fig. 1, a parabolic antenna is shown. It is to be understood that this is merely illustrative, since a uniformly excited broadside array of equal aperture will have a substantially identical pattern, as will a horn antenna or various other types which are well known in the art, and such antennas can be substituted for that here shown without departing from the spirit of this invention. Considering the parabolic type of antenna, however, the point 3 represents the focus. If a dipole be located at this point the principal lobe of the pattern produced will lie on the axis of the parabola. If, however, the dipole be laterally displaced slightly from the axis, as, for example, to the point 5, the axis of the principal lobe will be shifted in the opposite direction by a substantially equal angle. In the present case the two dipoles are indicated as located at the points 5 and 5', shifted symmetrically to either side of the axis of the parabolic reflector so that, while each of the dipoles considered by itself is assymetrically located, considered together the arrangement is symmetrical. Transmission lines 7 and 7' connect from the two dipoles to substantially identical receivers 9 and 9', these receivers being provided with a common oscillator 11 for heterodyning the received signals down to a frequency which is more readily handled than the ultra-high or microwave frequencies used for radar or beacon purposes. The heterodyned signals are fed through leads 13 and 13' to the modulator 15 where they are compared or combined and the output signal from the modulator is fed to the grid or control electrode 17 of a display tube 19 of known type.

The drawing also shows a transmitter 21. This transmitter supplies, through an electronic switch or "TR box" 23, the two dipoles 5 and 5' in parallel. At the instant the transmitter is pulsed, the signal is fed to a "one shot" multivibrator 25, which, for an interval, permits the modulator to operate to compare the signals received on the two channels. After a predetermined delay, however, it disables the modulator, permitting a signal of the ordinary type (i. e., one dependent on the amplitudes or the algebraic sum of the amplitudes rather than their product) to be fed to the grid 17.

Figure 2:
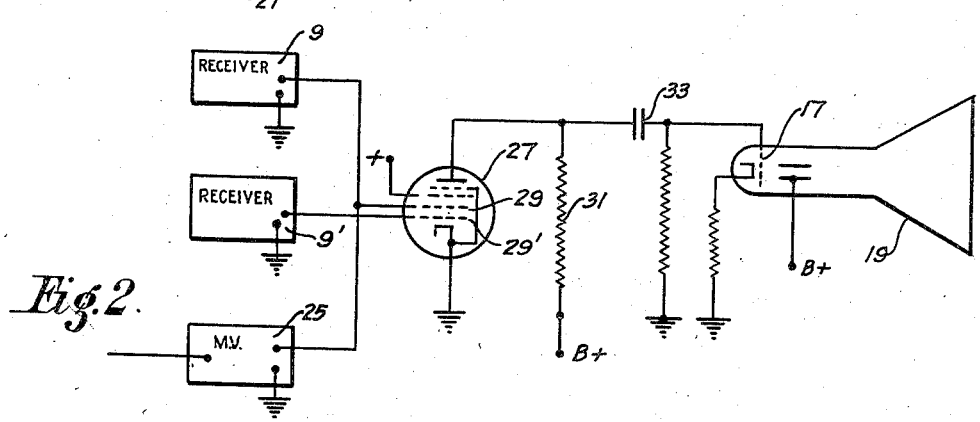
Fig. 2 is a diagram partly in block form but showing schematically one form of modulator which may be used in connection with the system here described, including means for automatically converting the system into one of conventional type at extreme ranges.

One means of accomplishing this last is shown in Fig. 2. In this case the modulator comprises a tube 27, which may be of the pentagrid type. This tube is provided with two control grids 29 and 29', both of which are normally biased to cutoff. In the case of the grid 29 this cutoff bias is provided by one output of the multivibrator 25, which is so adjusted that, in its stable state, the grid 29 connects to the one of its two tubes which is, at the moment, carrying current, the point of connection being so adjusted that this corresponds to cutoff of this grid. Receiver 9' connects to grid 29' and is biased to cutoff at all times. When the multivibrator is pulsed grid 29 is carried to cutoff, therefore the tube will carry current only when both grids are positive. At the predetermined interval to which the multivibrator 25 is set it resumes its stable state and carries the grid 29 positive to the saturation point, so that signals applied to it are substantially without effect. The tube will therefore carry current whenever the grid 29' is driven positive by a signal, and the circuit therefore acts as a normal radar receiver, responsive to the amplitude of the signal as received on antenna 5.

When the tube carries current the drop through resistor 31 is applied through condenser 33 to the grid 17 of tube 19 and an indication is given in accordance with usual practice. It is to be understood that in this description the circuits used have been greatly simplified in order to show the principles of operation of the device and that in practice additional amplifiers would be used, if only for the purpose of reversing the phase of the signal as applied to the grid 17 so as to produce a bright spot on the screen of the display tube instead of a dark one as would be shown in the case here given.

Figure 3:
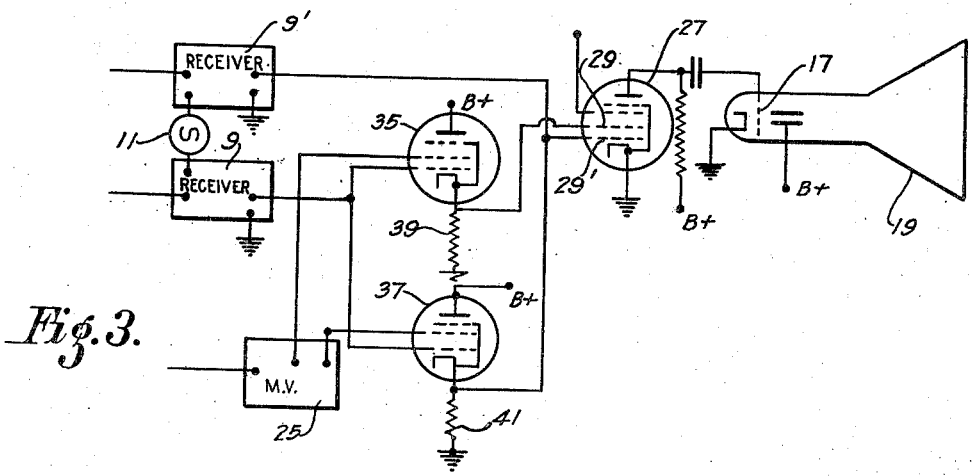
Fig. 3 is a diagram of the same character as Fig. 2 illustrating another method of conversion for use at extreme ranges.

Fig. 3 shows a slightly more elaborate arrangement. In this case the signals from receivers 9 and 9' are applied to the two control grids of the tube 27 as before. In this case, the signal from receiver 9' is connected to grid 29 directly. The signal from receiver 9 is fed to the grids of two gating tubes, 35 and 37 respectively, each of these tubes being connected as a cathode follower. The two outputs of the multivibrator 25 connect respectively to the screen grids of the tubes 35 and 37, making them alternately positive, so that the tubes conduct, and negative, so that they are cut off. Cathodes resistor 39 of tube 35 connects to control grid 29. The cathode resistor 41 of tube 37 connects to grid 29'. This resistor also serves as an output cathode resistor for the final tube of receiver 9', and the potentials appearing across it are therefore proportional to the algebraic sum of the potentials applied to the grids of the receiver output tube and tube 37 respectively, this being a common form of summation network.

This arrangement results in reducing the amplitudes of the side lobes where they are out of phase, and broadening the principal lobe, the effective K being approximately the same as in conventional systems using non-uniformly excited apertures, i. e., in the neighborhood of 1.25.

The operation of the device can probably best be understood by consideration of Fig. 5. In this figure the antenna patterns of the two channels are plotted semilogarithmically in terms of the angle $x$ as defined in connection with Equation 3 above. The lobes 45, 45₁ and 45₂ represent the principal and first two side lobes of the pattern as received on channel 7, these lobes being plotted against the scale at the bottom of the figure. The principal lobe 45 and the second side lobe 45₂ are shown in dashed lines, these two lobes being in the same phase, while lobe 45₁ is shown dotted, this lobe being 180° out of phase with the principal lobe. Curves 45', 45'₁ and 45'₂ are plotted against the scale at the top of the figure and represents the amplitude of the signal as received over channel 7'. In this second set of curves the same convention is shown to indicate the relative phases of the lobes, since in a logarithmic plot of this character only absolute values can conveniently be indicated.

As has been mentioned, the circuits will pass signals to the indicator only when those received over both channels are in phase; as shown in the figure this occurs only in the range where the curves relative to both channels are shown in dash lines. The strength of the signal is proportional to the product of the amplitudes of the signals received on the two channels. The indicator will respond only when this product is positive, i. e., when the signals received over both channels are in the same phase, which occurs only over the angle where the two principal lobes overlap. The intensity of the composite signal, as delivered to the indicator, is shown by the solid line 47 of Fig. 5. On each side of the range covered by this solid curve the successive side lobes are in opposite phase and consequently no signal is transmitted to the indicator over these ranges.

In the curves of Fig. 5, the lobes of the two patterns coincide exactly. As will be seen from Equation 3, however, the angle $x$ does not vary directly as the angle but as the sine of that angle. It follows that the lobes more distant from the axis of the system as a whole gradually get "out of step" so that cancellation is not complete. This is not a serious difficulty, however, as the areas wherein the lobes of the two channels are in phase are very near the nulls and become of appreciable width only in the more remote lobes which are already highly attenuated. The failure of cancellation is therefore of no practical importance. For example, with a ratio $a/\lambda=10$ the conventional type of array, using uniform excitation, would give a width of the principal beam between points of zero reception of 11.6°. With the system here described the width of the principal lobe would be reduced to one-half of this, or 5.8° between nulls. The first measurable discrepancy between the side lobes referable to the two channels comes between the inner edges of the third side lobe of one channel and the second side lobe of the other. The resultant lobe is less than 0.2° wide and is nearly 70 db down in comparison with the principal lobe. With more remote lobes the disparities become progressively wider and slightly more prominent. Thus the residual lobe resulting from failure of the fifth and sixth lobes respectively of the two channels to coincide is 0.26° wide. The fifth and sixth lobes are themselves greatly reduced in magnitude in comparison with the principal lobe (approximately to 1/16 and 1/19 amplitude respectively at the point where they fail to overlap) and while the attenuation is not as great as in the case of nearer lobes the resultant signal is still over 60 db down and the chance of confusion is negligible. With the ratio $a/\lambda$ chosen for illustration the residual lobe thus produced between the fifth and sixth lobes is at a 30° angle from the axis of the principal lobe, and the chance of confusion due to the extremely small residual lobes is too small to be a practical matter.

In the figures given for attenuation of the side lobes and the slight residual lobes remaining after the substantial cancellation of such side lobes the "one-way power pattern" has been used. These would be the value obtained if the system were used to receive signals radiated in all directions from a beacon. In the case of signals transmitted by the system itself, as has been described above, still greater attenuation would be obtained owing to the directional characteristics of the transmission. Where the two receiving couplings are used in parallel for transmission the transmitted lobe would be somewhat broader than in the case of the received lobes and the side lobes would be slightly displaced. The gain in resolution realizable from the system is so great, however, that the additional gain in resolution obtainable due to the use of a directional beam is of small importance and it therefore will not be considered in detail here.

As has already been mentioned there is some loss of sensitivity due to the intermodulation of the received signals. This loss may be very considerable. Where the power which can be radiated is the limitation upon the range of the system this may be important, but under ordinary conditions the increase in resolution for a given aperture is well worth the sacrifice. The ability to transform the system into one of substantially normal type at longer ranges more than compensates for this loss in sensitivity, especially since at short range the real trouble with a radar set is that it has too much sensitivity and so allows response on the side lobes. In effect, the use of this system makes a practical S-band radar very nearly the equivalent in resolving power of conventional X-band radar using the same physical dimensions of the antenna array.

The means used for comparing the phases of the signals received on the two channels need not be of the type described, nor need it be a modulator in the ordinary sense. Many types of modulators may be employed, but it is also possible to use circuits of the "all or none" type for at least one of the channels. For instance, the signals may be employed to actuate a gate circuit which opens when the two are in phase but is otherwise closed, the gated circuit carrying either or both of the individual channel signals. This arrangement gives somewhat greater sensitivity at the expense of greater amplitude of the residual side lobes. (This is essentially a "coincidence circuit.")

In this connection it might appear that an arrangement wherein an out-of-phase signal in one channel was used to suppress a signal in the other channel would be the equivalent of the arrangements described, wherein two in-phase signals are required to give an indication. That this is not the case can easily be seen by reference to Fig. 5. Consider a signal received from an angle $x=\pi/2$ from the axis of the array as a whole. This direction is the maximum of the principal lobe of one channel and a null of the other. Where both signals are necessary for an indication there will be no response from this angle, but it follows that there would be no signal to suppress that in the controlled channel if the other arrangement were used and the desired sharpening of the lobe would not be obtained. The composite lobe would, in fact, be only 3 db down from its maximum value, and there would remain a material angle beyond this where the signal relied upon for cancellation attained a great enough amplitude to suppress the signal with certainty. This modification of the principles here set forth would therefore not only produce an asymmetrical pattern but would require that, over one of the two quadrants facing the array, a stronger signal be controlled by a weaker one; an undesirable arrangement at best.

I claim:

1. A directional radio system comprising a directive antenna system having two substantially identical characteristic patterns, each comprising a principal lobe and a plurality of side lobes each substantially equal in angular width from null to null to one-half the width from null to null of said principal lobe, said patterns being angularly displaced so that the maximum of each principal lobe coincides with a null of the other, a pair of circuits so coupled to said antenna system as to respond respectively to said patterns so that signals received by said circuits from any direction are in phase when received from corresponding lobes of both patterns but out of phase when received from different-order lobes, a pair of radio receivers fed respectively from said pair of circuits, means fed by said receivers for comparing the phases of the received signals and producing a resultant signal only when the received signals are in the same phase, and indicating means responsive to resultant signals from said comparing means.

2. A system in accordance with claim 1 wherein said phase comparing means comprises means for multiplying said signals by each other, said indicating means being responsive only when the product of such multiplication is positive.

3. A directional radio system in accordance with claim 1 wherein said phase comparing means comprises a vacuum tube having a cathode, an anode and at least two control electrodes, means for biasing both of said control electrodes substantially to cutoff, circuits connecting said control electrodes to said receivers connected respectively to said two coupling means, and a circuit supplying said indicating means connecting said cathode and anode.

4. A directional radio system in accordance with claim 1 comprising a heterodyne frequency changer included in each of said radio receivers and a common local oscillator supplying each of said frequency changers, said phase comparing means being connected to compare said signals after change of frequency by said frequency changing means.

5. A directional radio system in accordance with claim 1 including a radar transmitter connected to excite said antenna system in the same phase through both circuits of said pair.

6. A directional radio system in accordance with claim 5 including switching means, operative at a predetermined interval following the initiation of a signal from said radar transmitter, for disabling said comparing means and transferring signals from at least one of said receivers to said indicating means without multiplication by the other.

7. A directional radio system in accordance with claim 5 including switching means, operative at a predetermined interval following the initiation of a signal from said radar transmitter for disabling said comparing means and applying to said indicating means signals which are a function of the algebraic sum of the signals from said two receivers.

8. A directional radio system comprising an antenna array of the substantially uniformly excited type having a transmitting pattern when symmetrically excited comprising a principal lobe flanked by side lobes of alternating phase, said pattern being displaced in direction with respect to the plane of said array when asymmetrically excited, a pair of means for coupling to said array at positions mutually displaced with respect thereto, at least one of said coupling means being asymmetric with respect to said array, said displacement being such as to displace the respective patterns by one-half the full width of said principle lobe, radio receiving means connected to each of said coupling means, means fed by said receiving means for comparing the phase of radio signals received through each of said coupling means, and indicating means responsive only when said received signals are of the same phase.

9. A directional radio system in accordance with claim 8 wherein said phase comparing means comprise a modulator multiplying one of said signals by the other and said indicating means responds only when the product of such multiplication is positive.

10. Apparatus in accordance with claim 8 including a radar transmitter, and connections from said transmitter to said antenna array, said connections being symmetrically coupled to said system.

11. Apparatus in accordance with claim 8 wherein said coupling means are equally displaced from the axis of symmetry of said array on opposite sides of said axis.

12. Apparatus in accordance with claim 11 including a radar transmitter, and connections from said transmitter to both of said coupling means for exciting said array symmetrically during transmission.

References Cited in the file of this patent

UNITED STATES PATENTS

| | | |
|---|---|---|
| 2,109,475 | Fanning | Mar. 1, 1938 |
| 2,176,469 | Moueix | Oct. 17, 1939 |
| 2,354,254 | Gerhard | July 24, 1944 |
| 2,426,183 | Deloraine | Aug. 26, 1947 |
| 2,434,253 | Beck | Jan. 13, 1948 |
| 2,456,666 | Agate | Dec. 21, 1948 |
| 2,476,639 | Thomas | July 19, 1949 |
| 2,493,774 | Moore | Jan. 10, 1950 |
| 2,502,317 | Ewing | Mar. 28, 1950 |
| 2,508,384 | Gross | May 23, 1950 |
| 2,509,207 | Busignies | May 30, 1950 |
| 2,564,694 | Huber et al. | Aug. 21, 1951 |